(12) United States Patent
Uchida

(10) Patent No.: US 6,922,003 B2
(45) Date of Patent: Jul. 26, 2005

(54) BRUSH HOLDER DEVICE FOR DYNAMOELECTRIC MACHINE

(75) Inventor: Yasuaki Uchida, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 0 days.

(21) Appl. No.: 10/852,191

(22) Filed: May 25, 2004

(65) Prior Publication Data

US 2004/0245886 A1 Dec. 9, 2004

(30) Foreign Application Priority Data

Jun. 4, 2003 (JP) ........................................ 2003-159954
Jun. 12, 2003 (JP) ........................................ 2003-168086

(51) Int. Cl.⁷ ............................................. H02K 39/38
(52) U.S. Cl. ..................................... 310/239; 310/244
(58) Field of Search .................... 310/42, 225, 238–245

(56) References Cited

U.S. PATENT DOCUMENTS 4,851,730 A * 7/1989 Fushiya et al. ............. 310/249
6,229,242 B1 * 5/2001 Autret et al. ............... 310/239
6,677,693 B2 * 1/2004 Ooyama ..................... 310/239

FOREIGN PATENT DOCUMENTS

JP           U-5-4750       1/1993
JP           A-9-107651     4/1997

* cited by examiner

Primary Examiner—Thanh Lam
(74) Attorney, Agent, or Firm—Posz Law Group, PLC

(57) ABSTRACT

Each brush holder is formed by bending a holder material made of a metal plate, so that the brush holder is shaped into a generally rectangular tubular body, which includes opposed first and second lateral walls, a top wall and a base wall. A base plate includes holder limiting grooves. Each brush holder is received in a corresponding one of the limiting grooves. The limiting groove limits an increase in a space between the first lateral wall and the second lateral wall of the corresponding brush holder. Furthermore, each brush is received in a corresponding one of the brush holders in a slidable manner in a sliding direction toward and away from a commutator of a motor.

18 Claims, 11 Drawing Sheets

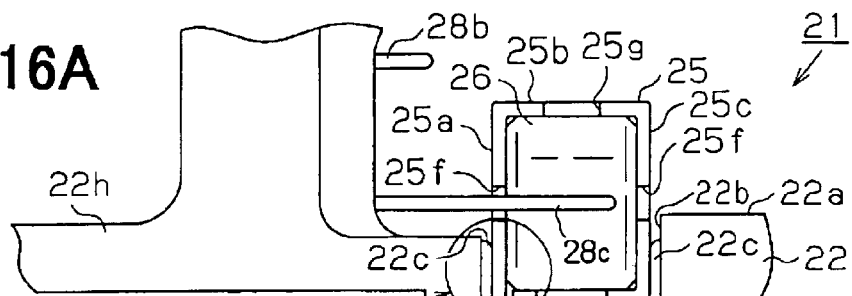
FIG. 16A
FIG. 16B
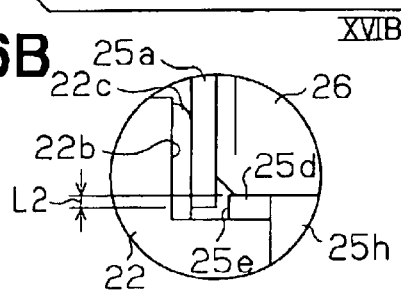
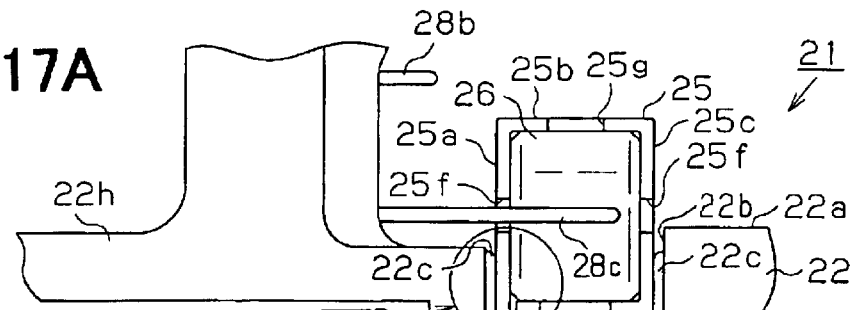
FIG. 17A
FIG. 17B
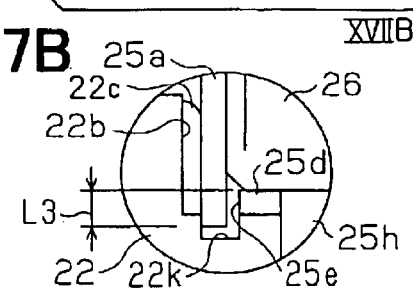
FIG. 18
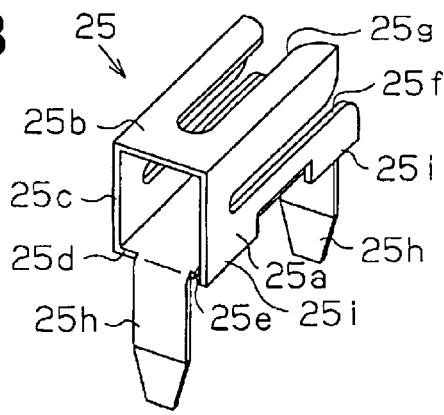

BRUSH HOLDER DEVICE FOR DYNAMOELECTRIC MACHINE

CROSS REFERENCE TO RELATED APPLICATION

This application is based on and incorporates herein by reference Japanese Patent Application No. 2003-159954 filed on Jun. 4, 2003 and Japanese Patent Application No. 2003-168086 filed on Jun. 12, 2003.

BACKGROUND OF THE INVENTION

1. Field of the Invention

The present invention relates to a brush holder device for a dynamoelectric machine.

2. Description of Related Art

In one previously proposed brush holder device for a dynamoelectric machine (e.g., a motor, a dynamo), each brush is slidably received in a corresponding brush holder, which is secured to a base plate, in such a manner that the brush is urged against a commutator of an armature by a spring to slidably engages the commutator.

Japanese Unexamined Utility Model Publication No. 5-4750 discloses one such brush holder device for a motor. In this brush holder device, a metal plate material is bent and thus has a square horseshoe shaped cross section, so that the brush holder is formed. A lower opening of the brush holder is oriented toward the base plate (a brush holder stay). Furthermore, securing claws of the brush holder are inserted through corresponding securing holes of the base plate and are bent against the base plate to secure the brush holder to the base plate by staking.

In a case where the base plate is formed from a dielectric resin material to achieve a light weight and high moldability of the base plate, the brushes are in direct contact with a top surface of the base plate. When the motor is rotated, the brushes are heated to a relatively high temperature. Due to the direct contact of the brushes with the base plate, the heated brushes may cause melting and thermal deformation of the top surface of the base plate. Such deformation of the top surface of the base plate, in turn, may prevent smooth movement of one or more brushes in the corresponding brush holder, causing generation of a spark or noise. To address such a disadvantage, the base plate can be made from a heat resistant resin material. However, the heat resistant resin material is generally expensive, resulting in increased manufacturing costs.

U.S. Pat. No. 6,229,242 discloses a brush holder device, which addresses the above disadvantage. In this brush holder device, a metal base plate is secured to a lower opening of a square horseshoe shaped brush holder (a cover plate), i.e., is secured to the top surface of the base plate (the brush holder plate) to prevent direct contact between the brush and the base plate. With this arrangement, even when the base plate is made from the inexpensive resin material, which has the low heat resistivity, the melting and thermal deformation of the base plate, which could be caused by the high temperature of the heated brushes upon rotation of the motor, can be limited since the brushes do not directly contact the base plate.

However, in the case of the brush holder device disclosed in U.S. Pat. No. 6,229,242, the metal base plate is additionally required for each brush. Thus, the number of components and the number of assembling steps are disadvantageously increased.

Furthermore, in the above case where each brush holder is formed by bending the metal plate, when the brush, which is received in the brush holder, is in sliding engagement with the rotating commutator, the brush is vibrated in the rotating direction of the commutator. The vibration of the brush tends to increase a space between two lateral walls of the brush holder. Thus, it is also demanded to limit the increase in the space between the lateral walls of the brush holder in a easy and effective way.

Furthermore, in one previously proposed brush holder device of the above kind, a circuit breaker is provided to prevent seizing (burnout) of the motor during rotation of the motor.

In the description of prior art of Japanese Unexamined Patent Publication No. 9-107651, one such prior art brush holder device, which has the circuit breaker secured relative to a base plate of the brush holder device, is recited. More specifically, the circuit breaker is held by a breaker holder, which is formed separately from the base plate and is installed to the base plate. However, in this case, the number of components and the number of manufacturing steps of the brush holder device are disadvantageously increased, resulting in an increase in the manufacturing costs of the brush holder device.

To address the above problem, Japanese Unexamined Patent Publication No. 9-107651 proposes one brush holder device. In this brush holder device, one of two terminals of the circuit breaker is connected to a pigtail, which extends from a brush, and the other one of the terminals is securely connected to one end of a preexisting conductive terminal member (lead plate). The other end of the terminal member is secured to a motor housing together with the base plate by a conductive screw, so that the other end of the terminal member is grounded to the motor housing, which is, in turn, grounded to a vehicle body. In this way, the terminal member is used to electrically connect the circuit breaker to the ground and is also used to secure the circuit breaker. Thus, the breaker holder is no longer required in the brush holder device. As a result, the number of manufacturing steps is reduced to reduce manufacturing costs of the brush holder device.

The above circuit breaker includes a cover, a case and a switch member. The one of the terminals extends from the cover. The other one of the terminals is provided in the case. The switch member is received in the case and is positioned between the case and the cover. The switch member stops flow of drive current in the motor when the drive current becomes equal to or greater than a predetermined value. In the circuit breaker, an opening of the case is closed by the cover through an insulating paper to cover the switch member received in the case. Thus, the case and the cover are electrically insulated from one another.

However, the two terminals project in opposite directions. Thus, at the time of connecting a lead wire or a terminal of the base plate to the terminals of the circuit breaker, a moving distance of a connecting machine for connecting them is disadvantageously increased. Particularly, in a situation where the case extends from one axial side of the base plate to the other axial side of the base plate such that the two terminals of the circuit breaker are disposed on the axial sides, respectively, of the base plate, the connecting operation of the connecting machine needs to be performed on each of the axial sides. Furthermore, lately, many brush holder devices have noise limiting elements, and the motors are downsized. Thus, spaces for accommodating the circuit breaker and the terminal member are limited. As a result, it is demanded to arrange the case to extend from the one axial side to the other axial side of the base plate to reduce a space required to accommodate the case. Because of the above reasons, it has been demanded to arrange the cover of the circuit breaker and the terminal member close to one another while maintaining a sufficient space therebetween and electrical insulation therebetween. In such a case, when the terminal member is connected to the other one of the terminals of the circuit breaker, the terminal member could be unintentionally placed to contact the cover due to, for example, vibrations of the motor. When the terminal member contacts the cover, the terminal member and the cover are electrically connected to one another, i.e., are shortcircuited without passing through the switch member, disenabling the function of the circuit breaker. Particularly, as described above, when the case of the circuit breaker extends from the one axial side to the other axial side of the base plate, the terminals of the circuit breaker can extend from the same side of the circuit breaker to improve the connecting operation. However, since the terminals of the circuit breaker are held close to one another, and the terminals of the base plate to be connected with the terminals of the circuit breaker overlap with the circuit breaker, it is difficult to achieve reliable insulation between the cover and the terminal member.

SUMMARY OF THE INVENTION

The present invention addresses the above disadvantages. Thus, it is an objective of the present invention to provide a brush holder device, in which at least one brush holder is effectively and securely held by a base plate while effectively limiting thermal deformation of the base plate, which would be caused by overheating of a brush received in the brush holder, at minimum manufacturing costs. It is another objective of the present invention to provide a brush holder device, which achieves more reliable operation of the circuit breaker while minimizing manufacturing costs of the brush holder device.

To achieve the objectives of the present invention, there is provided a brush holder device for a dynamoelectric machine. The brush holder device includes a base plate, at least one brush holder and at least one brush. The base plate is made of a dielectric resin material. The base plate includes at least one limiting portion. The at least one brush holder is secured to the base plate. Each of the at least one brush holder is formed by bending a holder material made of a metal plate, so that each of the at least one brush holder is shaped into a generally rectangular tubular body, which includes opposed first and second lateral walls, a top wall and a base wall. At least one of the at least one limiting portion of the base plate limits an increase in a space between the first lateral wall and the second lateral wall of a corresponding one of the at least one brush holder. Each of the at least one brush is received in a corresponding one of the at least one brush holder in a slidable manner in a sliding direction toward and away from a commutator of the dynamoelectric machine.

The brush holder device may further include a terminal member and a circuit breaker. The terminal member is connected to one of the at least one brush. The circuit breaker is connected to the one of the at least one brush through the terminal member. The circuit breaker stops electric current, which passes through the one of the at least one brush, when the electric current, which passes through the one of the at least one brush, becomes equal to or greater than a predetermined value. The terminal member can serve as a first terminal member. The circuit breaker may include a first conductive housing member, a second conductive housing member, a switch means and an insulating member. The first conductive housing member includes a first terminal, which projects outwardly from the first conductive housing member and directly contacts the first terminal member to form an electrical connection therebetween. The second conductive housing member is opposed to and is connected to the first conductive housing member. The second conductive housing member includes a second terminal, which projects outwardly from the second conductive housing member. The switch means is placed between the first conductive housing member and the second conductive housing member. The switch means electrically connects between the first conductive housing member and the second conductive housing member when the electric current, which passes through the one of the at least one brush, is less than the predetermined value. The switch means electrically disconnects between the first conductive housing member and the second conductive housing member when the electric current, which passes through the one of the at least one brush, is equal to or greater than the predetermined value. The insulating member is held between the first conductive housing member and the second conductive housing member to electrically insulate between the first conductive housing member and the second conductive housing member. The brush holder device may further include a second terminal member, which directly contacts the second terminal of the second conductive housing member to form an electrical connection therebetween. The base plate includes an insulating projection, which is placed between one of the first and second terminal members and an adjacent one of the first and second housing members, which is positioned adjacent to the one of the first and second terminal members, to electrically insulate therebetween.

BRIEF DESCRIPTION OF THE DRAWINGS

The invention, together with additional objectives, features and advantages thereof, will be best understood from the following description, the appended claims and the accompanying drawings in which:

FIG. 16A is a cross sectional view similar to FIG. 4A, showing a modification of the brush holder device;

FIG. 16B is an enlarged view of a circled portion indicated by an arrow XVIB in FIG. 16A;

FIG. 17A is a cross sectional view similar to FIG. 4A, showing another modification of the brush holder device;

FIG. 17B is an enlarged view of a circled portion indicated by an arrow XVIIB in FIG. 17A;

FIG. 18 is a perspective view showing a modification of the brush holder;

DETAILED DESCRIPTION OF THE INVENTION

An embodiment of the present invention will be described with reference to the accompanying drawings.

Figure 1:
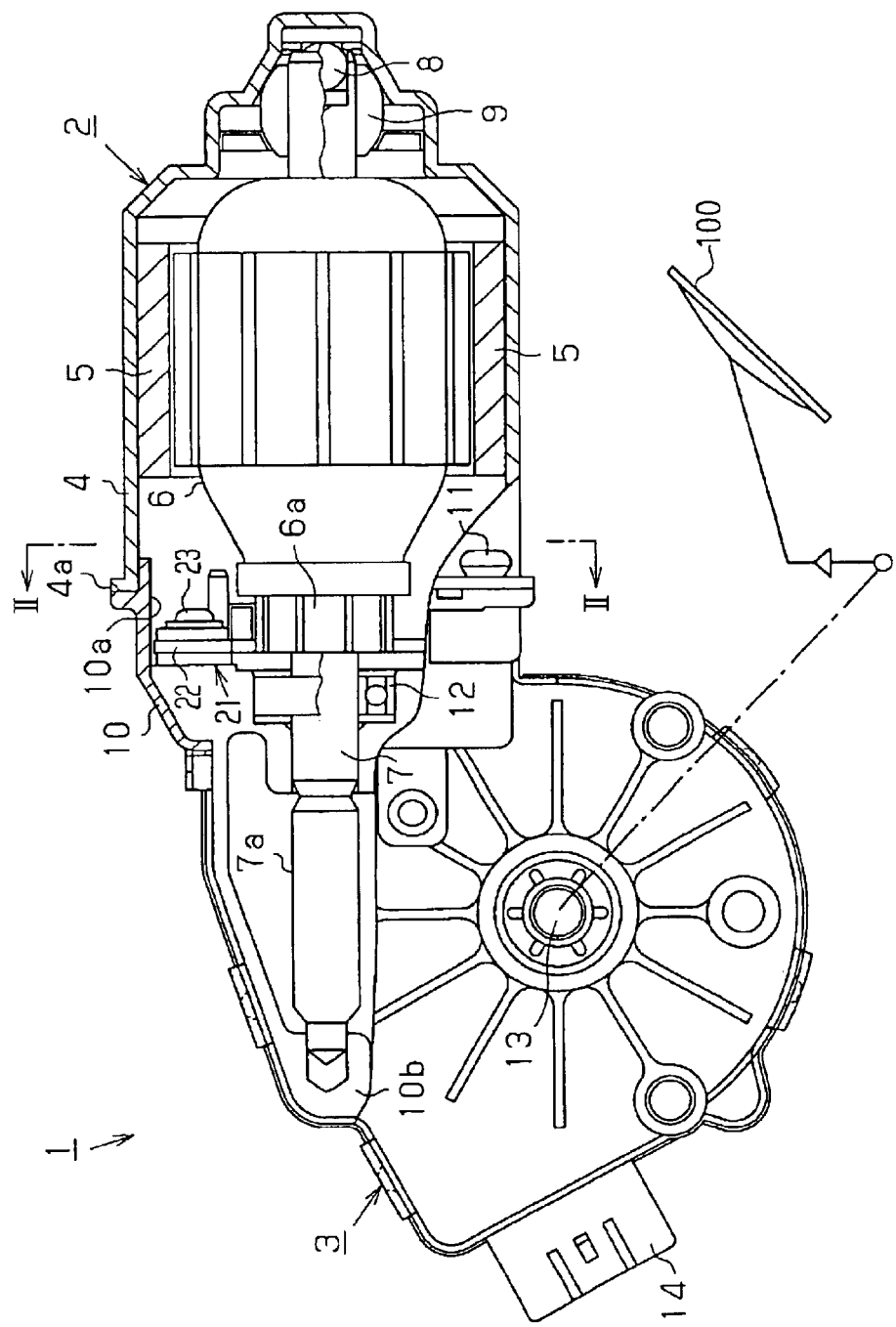
FIG. 1 is a cross sectional view of a wiper motor according to an embodiment of the present invention.

A wiper motor (a dynamoelectric machine) 1 shown in FIG. 1 is used as a drive source of a vehicle wiper system, which wipes rain droplets adhered to a windshield (front glass) through use of wipers 100 (only one is shown in FIG. 1). The wiper motor 1 includes a motor unit 2 and a speed reducing unit 3.

A yoke housing 4 of the motor unit 2 is made of an electrically conductive metal material and is formed into a cup shape. A plurality of magnets 5 is secured to an inner peripheral surface of the yoke housing 4. An armature 6 is rotatably received in the yoke housing 4 at a corresponding position that is radially inward of the magnets 5. A thrust bearing 8 and a radial bearing 9, both of which rotatably support a base end of a rotatable shaft 7 of the armature 6, are provided in a base of the yoke housing 4. A gear housing 10 of the speed reducing unit 3 is assembled to an opening 4a of the yoke housing 4 by screws 11 and covers a projected portion of the rotatable shaft 7, which is projected from the yoke housing 4.

The gear housing 10 is made of a metal material, such as aluminum alloy, and includes an opening 10a that has a shape, which generally coincides with that of the opening 4a of the yoke housing 4. Furthermore, the gear housing 10 is configured to receive a distal end side of the rotatable shaft 7 and an undepicted worm wheel. A roller bearing 12, which rotatably supports an intermediate portion of the rotatable shaft 7, is secured in the gear housing 10. Furthermore, a bearing part 10b, which rotatably supports a distal end of the rotatable shaft 7, is formed in the gear housing 10. A worm 7a is formed in the rotatable shaft 7 at an intermediate location between the bearing 12 and the bearing part 10b and is meshed with the undepicted worm wheel. An output shaft 13 is formed in the worm wheel in such a manner that the output shaft 13 extends perpendicular to the rotatable shaft 7. Rotation of the rotatable shaft 7 is decelerated and is outputted through the output shaft 13. The gear housing 10 is secured to an attachment bracket of the vehicle wiper system. Wiper arms of the wipers 100 are connected to the output shaft 13 through a link mechanism of the vehicle wiper system. When the output shaft 13 is rotated, each wiper 100 is swung to perform predetermined wiping movement.

Figure 2:
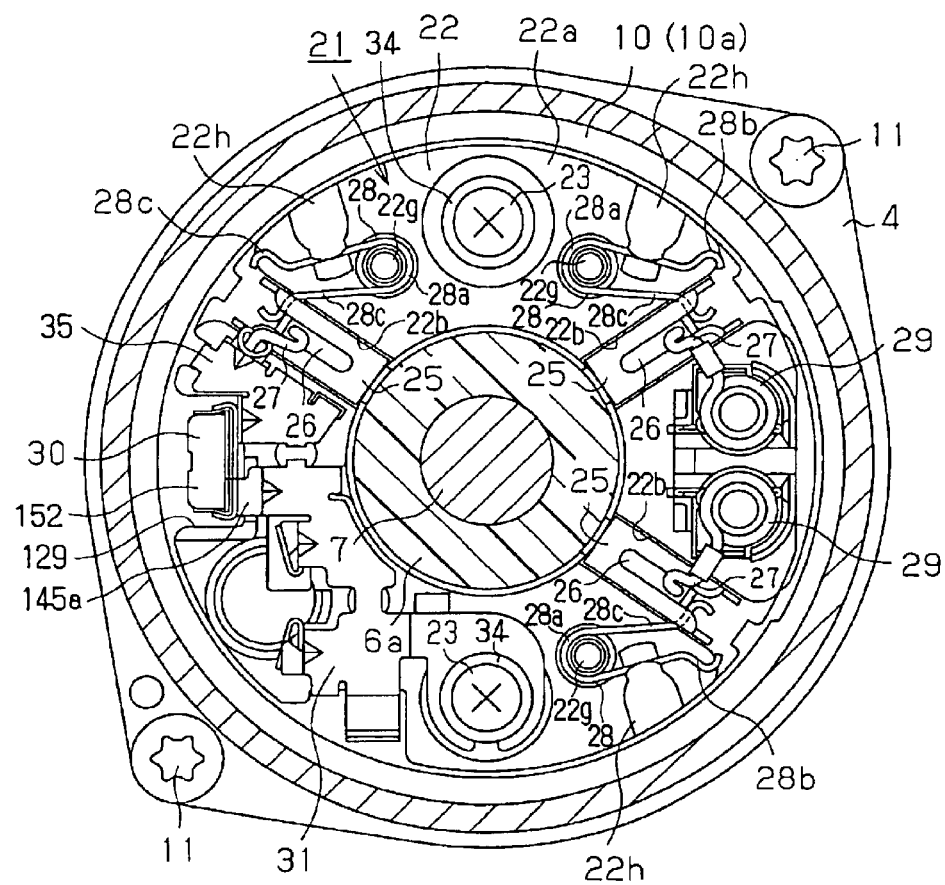
FIG. 2 is a cross sectional view taken along line II—II in FIG. 1.

As shown in FIG. 2, a brush holder device 21, which constitutes a portion of the motor unit 2, is installed to the opening 10a of the gear housing 10. The brush holder device 21 includes a generally annular base plate 22. The base plate 22 is made of a resin material, desirably a dielectric thermoset resin material, such as phenolic resin. The rotatable shaft 7 and a commutator 6a secured thereto are received through a through hole that extends through a center of the base plate 22. The base plate 22 (the brush holder device 21) is secured to the gear housing 10 by two screws 23.

Figure 3:
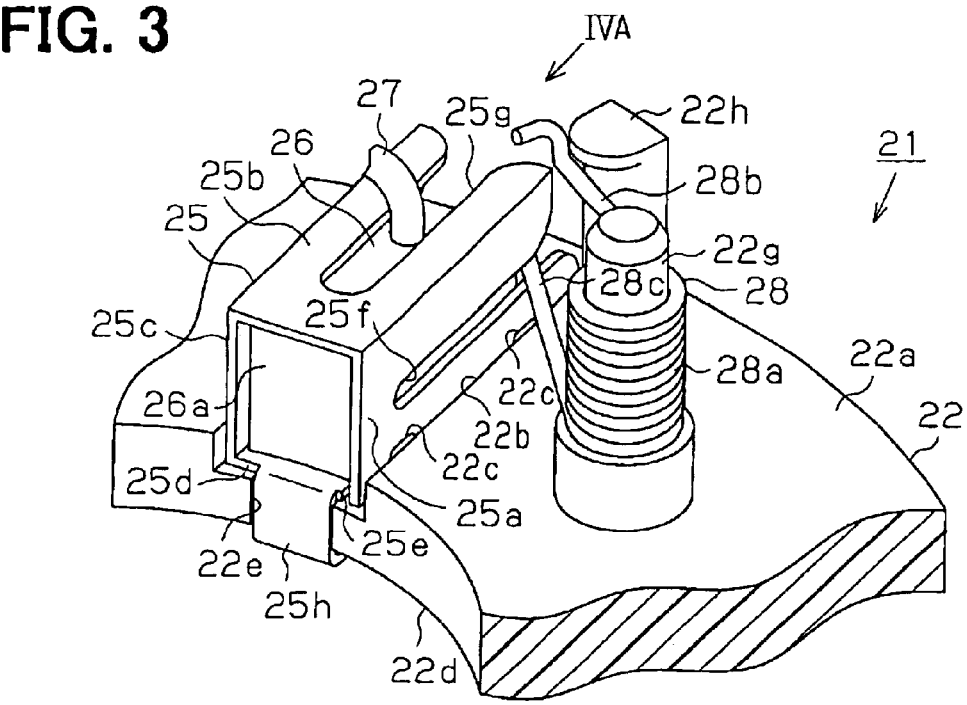
FIG. 3 is a partial perspective view of a brush holder device of the embodiment.

As shown in FIGS. 2–4, three brush holders 25 are secured to a top surface 22a of the base plate 22 and are arranged at predetermined intervals in a circumferential direction of the base plate 22. Each brush holder 25 receives a corresponding power supply brush (i.e., one of two positive pole side brushes and a negative pole side brush described in greater detail below) 26 in a slidable manner in a sliding direction (a radial direction of the base plate 22) toward and away from the commutator 6a and slidably engages the commutator 6a. Each brush 26 is formed into a generally rectangular parallelepiped shape. A slidably engaging surface 26a, which is in a form of a generally arcuate recess, is formed in a distal end (i.e., a radially inner end) of the brush 26 to slidably engage the commutator 6a. Furthermore, a pigtail 27 is connected to a top surface of the brush 26.

Figure 5A:
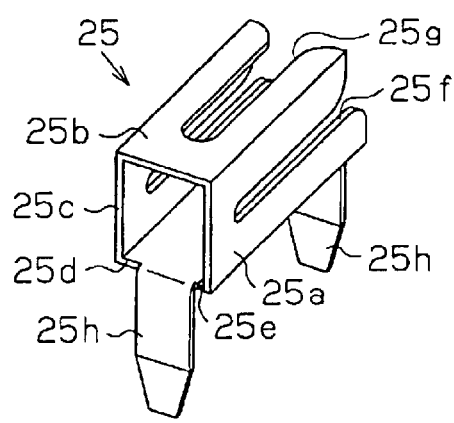
FIG. 5A is a perspective view of a brush holder of the brush holder device.
Figure 5B:
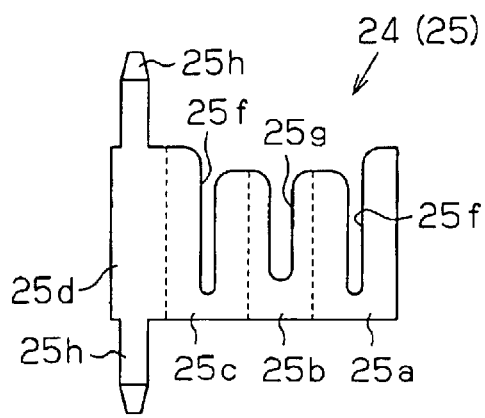
FIG. 5B is a plan view of an unfolded holder material for forming the brush holder of FIG. 5A.

Each brush holder 25 is desirably made of a metal material, which has a low electrical resistance for limiting generation of heat and has a relatively small spring property to allow bending of the metal material and retainment of the bent state of the metal material. In this instance, the brush holder 25 is formed by bending, i.e., folding a holder material 24 of FIG. 5B, which is formed from a metal plate made of, for example, brass through punching of the metal plate with use of a press machine. The brush holder 25 has a first lateral wall 25a, a top wall 25b, a second lateral wall 25c and a base wall 25d, which are formed integrally and continuously in this order. As shown in FIG. 5A, the first lateral wall 25a, the top wall 25b, the second lateral wall 25c and the base wall 25d are respectively bent at a right angle to form the brush holder 25, which is a generally rectangular tubular body opened in the sliding direction of the corresponding brush 26.

With this arrangement, the brush 26, which is received in the brush holder 25, does not directly contact the base plate 22 due to the presence of the base wall 25d between the brush 26 and the top surface 22a of the base plate 22. Thus, even when the brush 26 is heated to a high temperature, the heat of the brush 26 is not directly conducted to the base plate 22. As a result, it is possible to limit melting and thermal deformation of the top surface 22a of the base plate 22 (e.g., inflating deformation that could occur in the case of thermoset resin, and melting and thermal deformation that could occur in a case of thermoplastic resin) without a need for manufacturing the base plate 22 from an expensive heat resistant resin material. Because of the above reason, the base plate 22 of the present embodiment is made from the inexpensive resin material, which has the relatively low heat resistivity, to minimize the manufacturing costs of the brush holder device 21. Furthermore, in the brush holder 25, the base wall 25d, which prevents direct contact between the brush 26 and the base plate 22, is formed integrally with the lateral walls 25a, 25c and the top wall 25b. Thus, it is not required to provide a dedicated separate component for limiting the thermal deformation of the base plate 22. As a result, the number of components is not increased, resulting in minimized manufacturing costs.

Figure 4A:
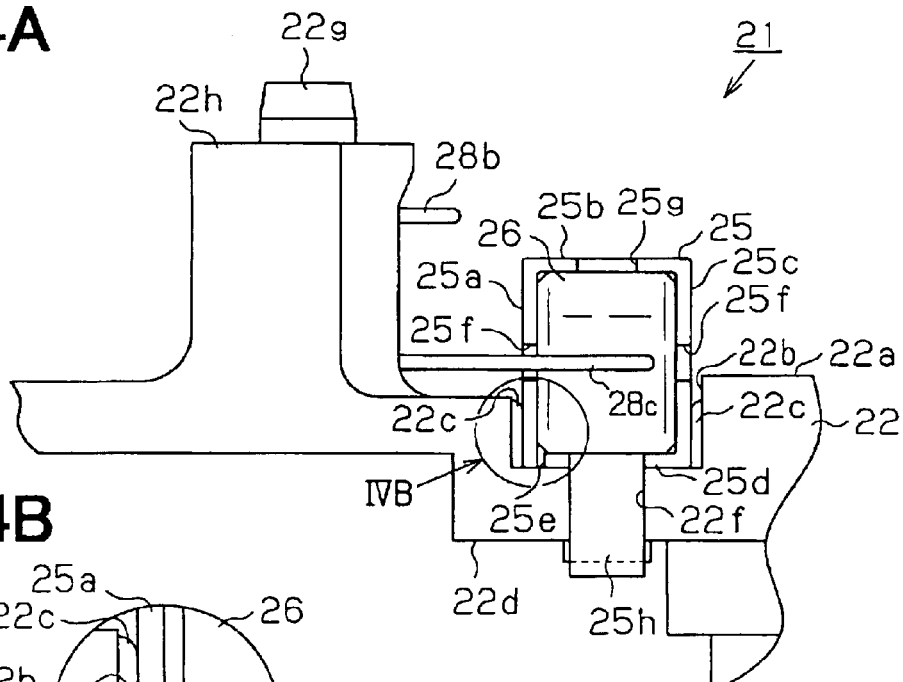
FIG. 4A is a view seen in a direction of arrow IVA in FIG. 3.
Figure 4B:
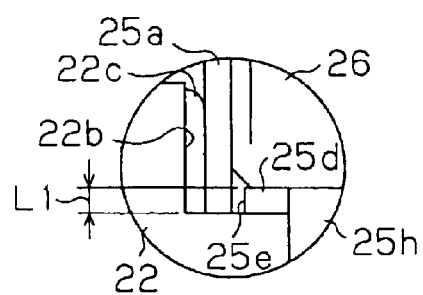
FIG. 4B is an enlarged view of a circled portion indicated by an arrow IVB in FIG. 4A.
Figure 6:
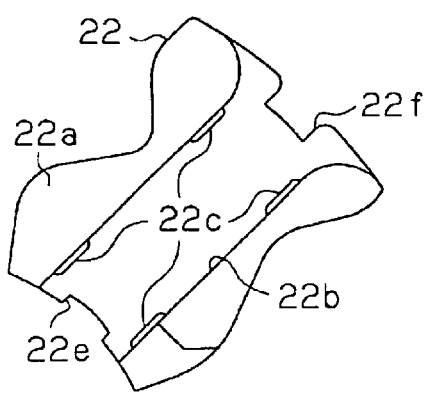
FIG. 6 is a partial plan view showing a holder limiting groove of a base plate of the brush holder device.

As shown in FIGS. 3–4B, a lower part of each brush holder 25 (i.e., lower parts of the lateral walls 25a, 25c and the base wall 25d) is received in a corresponding holder limiting groove 22b, which serves as a limiting portion or a limiting groove and is formed in the top surface 22a of the base plate 22. The holder limiting groove 22b is recessed in the top surface 22a of the base plate 22 in such a manner that the holder limiting groove 22b extends in the radial direction of the base plate 22 (i.e., the sliding direction of the brush 26). As shown in FIG. 6, four protrusions 22c are formed in the holder limiting groove 22b. Two of the protrusions 22c are formed in one of circumferentially opposed planar inner lateral surfaces of the holder limiting groove 22b, which are opposed to one another in the circumferential direction of the base plate 22. Furthermore, other two of the protrusions 22c are formed in the other one of the circumferentially opposed planar inner lateral surfaces of the holder limiting groove 22b in circumferentially opposed relationship to the two of the protrusions 22c formed in the one of the circumferentially opposed planar inner lateral surfaces of the holder limiting groove 22b. A space between the two circumferentially opposed protrusions 22c is set to be slightly smaller than a circumferential width of the corresponding brush holder 25, which is measured in the circumferential direction of the base plate 22. With this arrangement, the brush holder 25 is received in the holder limiting groove 22b in such a manner that the lower parts of the lateral walls 25a, 25c are lightly press fitted between the circumferentially opposed protrusions 22c of the holder limiting groove 22b. In this way, the brush holder 25 is securely received in the holder limiting groove 22b without causing substantial wobbling of the brush holder 25. Furthermore, movement of each of the lateral walls 25a, 25c is limited by the corresponding protrusions 22c at the circumferentially outward of the lateral wall 25a, 25c, so that it is possible to limit circumferentially outward deformation of the brush holder 25, which could be otherwise initiated at an unjoined part 25e that is located between the first lateral wall 25a and the base wall 25b.

More specifically, when the brush 26, which is received in the brush holder 25, slidably engages the rotating commutator 6a, the brush 26 intermittently engages commutator segments of the commutator 6a, which are arranged at equal angular intervals along an outer peripheral surface of the commutator 6a. Thus, small vibration occurs in the brush 26 in the rotating direction of the commutator 6a. Such vibration tends to enlarge a space between the lateral walls 25a, 25c. However, the holder limiting groove 22b limits the circumferentially outward deformation of the brush holder 25, which could be otherwise initiated at the unjoined part 25e, and thereby limits an increase in the space between the lateral walls 25a, 25c. This limits an increase in the wobbling of the brush 26 (i.e., the vibration of the brush 26 in the rotating direction of the commutator 6a). Therefore, it is possible to limit generation of noise, which could be caused by wobbling of the brush 26 in the brush holder 25 (i.e., noise generated upon hitting of the brush 26 against the lateral walls 25a, 25c), or to limit generation of a spark.

Furthermore, each lateral wall 25a, 25c does not contact the entire corresponding inner lateral surface of the holder limiting groove 22b. Rather, each lateral wall 25a, 25c contacts only the corresponding protrusions 22c, which are formed in the corresponding inner lateral surface of the holder limiting groove 22b. In a case where the protrusions 22c are entirely eliminated to allow surface contact of each lateral wall 25a, 25c with the entire corresponding inner lateral surface of the holder limiting groove 22b, precise dimensional control is required for the assembly of the brush holder 25 to ensure that each lateral wall 25a, 25c makes the close surface contact with the entire corresponding inner lateral surface of the holder limiting groove 22b. Unlike this case, according to the present embodiment, each lateral wall 25a, 25c is only engaged with the corresponding protrusions 22c, so that each lateral wall 25a, 25c makes a relatively small surface contact or a line contact with each of the corresponding protrusions 22c. As a result, even when the dimensional precision is relatively low, the brush holder 25 can be easily installed while the lateral walls 25a, 25c closely contact the protrusions 22c to limit the circumferentially outward deformation of the brush holder 25.

A slit 25f is formed in each lateral wall 25a, 25c within a movable range of an urging piece 28c of a corresponding torsion spring 28 (described below). Furthermore, a slit 25g is formed in the top wall 25b within a movable range of the pigtail 27 of the brush 26. These slits 25f, 25g are formed simultaneously at the time of forming the holder material 24 by punching the metal plate.

Two securing claws 25h extend from opposed longitudinal ends (opposed radial ends) of the base wall 25d, which are opposed to one another in the sliding direction (the radial direction of the base plate 22) of the brush 26. The securing claws 25h are bent toward each other in the sliding direction of the brush 26 on the rear surface 22d side of the base plate 22. Upon bending of the securing claws 25h, the brush holder 25 is secured to the base plate 22 by staking. Here, each securing claw 25h is bent such that the securing claw 25h is received in a corresponding claw receiving groove 22e, 22f, which is located in a corresponding one of an outer peripheral part and an inner peripheral part of the base plate 22 and extends in a thickness direction of the base plate 22 (i.e., in a direction perpendicular to an imaginary plane of the base plate 22 that is parallel to the top surface 22a or the rear surface 22b). In this way, each securing claw 25h is arranged without radially protruding from a corresponding peripheral edge of the base plate 22.

Three support pins 22g and three anchoring portions 22h project from the top surface 22a of the base plate 22 at locations near the corresponding brush holders 25. Furthermore, the torsion springs 28 are provided to the support pins 27, respectively. Each torsion spring 28 urges the corresponding brush 26 against the commutator 6a. A cylindrical main body 28a of each torsion spring 28 receives the corresponding support pin 22g, so that the torsion spring 28 is supported by the support pin 22g. One end of the torsion spring 28, which extends from the main body 28a, serves as an engaging piece 28b and is engaged with the corresponding anchoring portion 22h, which projects from the top surface 22a of the base plate 22. The other end of the torsion spring 28, which extends from the main body 28a, serves as the urging piece 28c and is inserted into the brush holder 25 through the corresponding slit 25f of the brush holder 25 to urge a rear end surface (i.e., an end surface opposite from the commutator 6a) of the brush 26 toward the commutator 6a.

Two noise limiting choke coils 29 and a circuit protective circuit breaker 30 are also arranged in the base plate 22. Each of the choke coils 29 is electrically connected between a connector 14 (FIG. 1) and the pigtail 27 of one of the two positive pole side brushes 26 (i.e. a high speed brush for rotating the wiper motor 1 at a high speed and a low speed brush for rotating the wiper motor 1 at a low speed). The circuit breaker 30 is connected to the pigtail 27 of the negative pole side brush (common brush) 26, which is commonly used with both the positive pole side brushes, through a positive pole side terminal plate (a terminal member) 35. The circuit breaker 30 is grounded to the gear housing 10 through a ground side terminal plate (a terminal member) 31, which is secured to the gear housing 10 by one of the screws 23 and a corresponding washer 34. The gear housing 10 is grounded to a vehicle body. Drive electric current is supplied from a vehicle side (i.e., a power source) through one of the choke coils 29, the brushes 26, the commutator 6a, armature winding coils and the circuit breaker 30 to drive the wiper motor 1 to perform a predetermined wiping movement of the wipers 100.

Figure 7:
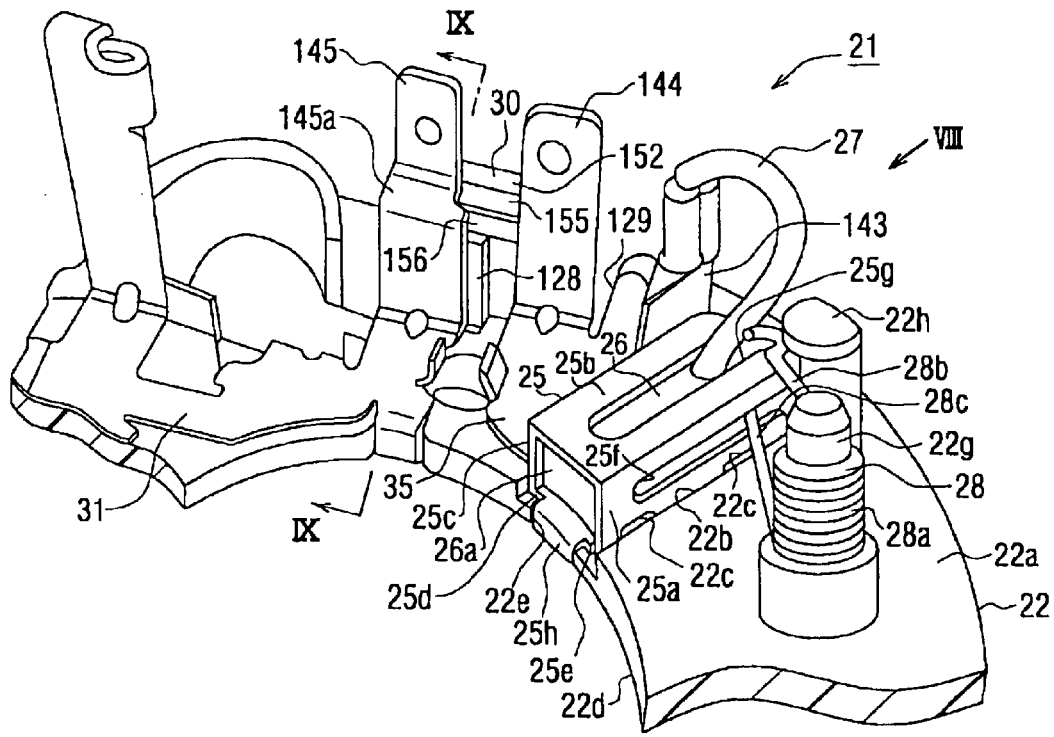
FIG. 7 is a partial perspective view showing the brush holder device.

As shown in FIG. 7, in the positive pole side terminal plate 35, a staking piece 143 is formed by bending a corresponding portion of a metal plate material such that the staking piece 143 projects in the thickness direction of the base plate 22. A distal end of the pig tail 27 of the common brush 26 is held by the staking piece 143 through staking (i.e., bending of the staking piece 143 around the distal end of the pig tail 27 to clamp the same). In this way, the positive pole side terminal plate 35 is electrically connected to the common brush 26. Furthermore, in the positive pole side terminal plate 35, a positive pole side terminal 144 is formed by bending a corresponding portion of the metal plate material such that the positive pole side terminal 144 projects in the thickness direction of the base plate 22. The positive pole side terminal 144 is bent in the same direction as that of the staking piece 143.

As shown in FIG. 2, the ground side terminal plate 31 is secured to the gear housing 10 by the conductive screw 23 together with the base plate 22. As shown in FIG. 7, in the ground side terminal plate 31, a ground side terminal 145 is formed by bending a corresponding portion of a metal plate material such that the ground side terminal 145 projects in the thickness direction of the base plate 22. The ground side terminal 145 is bent in the same direction as that of the positive pole side terminal 144 such that the ground side terminal 145 projects to generally the same axial height as that of the positive pole side terminal 144.

Figure 9:
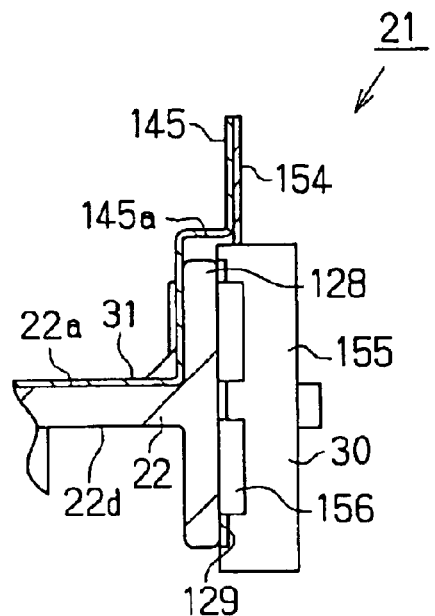
FIG. 9 is a cross sectional view taken along line IXA—IXA in FIG. 7.

As shown in FIG. 9, a radially outer side surface of a base end portion of the ground side terminal 145 engages a radially inner side surface of an insulating plate portion 128, which serves as an insulating projection that is formed integrally with the base plate 22. The insulating plate portion 128 projects from a peripheral edge of a receiving recess 129 in the thickness direction of the base plate 22. Furthermore, the insulating plate portion 128 projects from the base plate 22 on both axial sides (i.e., the top surface 22a side and the rear surface 22d side) of the base plate 22 in such a manner that the insulating plate portion 128 projects in the same amount in each of the top surface 22a side and the rear surface 22d side of the base plate 22. In a longitudinal intermediate point of the ground side terminal 145, a bent portion 145a is formed by bending a corresponding portion of the metal plate material such that the bent portion 145a extends toward a circuit breaker 30 side (i.e., toward the outer peripheral edge of the base plate 22). An axial height of a portion of the ground side terminal 145, which is measured from a base end of the ground side terminal 145 to a base end of the bent portion 145a is set to be slightly greater than an axial height of the insulating plate portion 128 on the top surface 22a side of the base plate 22. A length between the base end of the bent portion 145a to a distal end of the bent portion 145a is set to be slightly greater than a plate wall thickness of the insulating plate portion 128. A distal end portion of the ground side terminal 145 is formed by bending a corresponding portion of the metal plate material such that the distal end portion of the ground side terminal 145 extends from a distal end of the bent portion 145a in an extending direction of a ground side terminal 154 of the circuit breaker 30 (i.e., in the thickness direction of the base plate 22). As shown in FIG. 7, the distal end portion of the ground side terminal 145 is arranged next to the positive pole side terminal 144 in side by side relation in a width direction of the distal end portion of the ground side terminal 145 (i.e., in generally the circumferential direction of the base plate 22). More specifically, the ground side terminal 145 and the positive pole side terminal 144 are bent to extend in the common direction, i.e., in the thickness direction of the base plate 22. Furthermore, the ground side terminal 145 and the positive pole side terminal 144 are arranged in opposed relationship with a metal case (an electrically conductive housing member or simply referred to as an conductive housing member) 152 of the circuit breaker 30 in such a manner that each of a surface plane of the ground side terminal 145 and a surface plane of the positive pole side terminal 144 overlaps with that of the case 152 of the circuit breaker 30.

As shown in FIG. 9, the circuit breaker 30 is received in the receiving recess 129, which is radially inwardly recessed from an outer peripheral edge of the base plate 22 in the plane of the base plate 22. A radial depth (a radial length) of the receiving recess 129 is generally the same as a radial thickness of the case 152 of the circuit breaker 30. With this arrangement, the circuit breaker 30 is entirely received in the receiving recess 129, so that the circuit breaker 30 does not radially protrude from the outer peripheral edge of the base plate 22.

Figure 8:
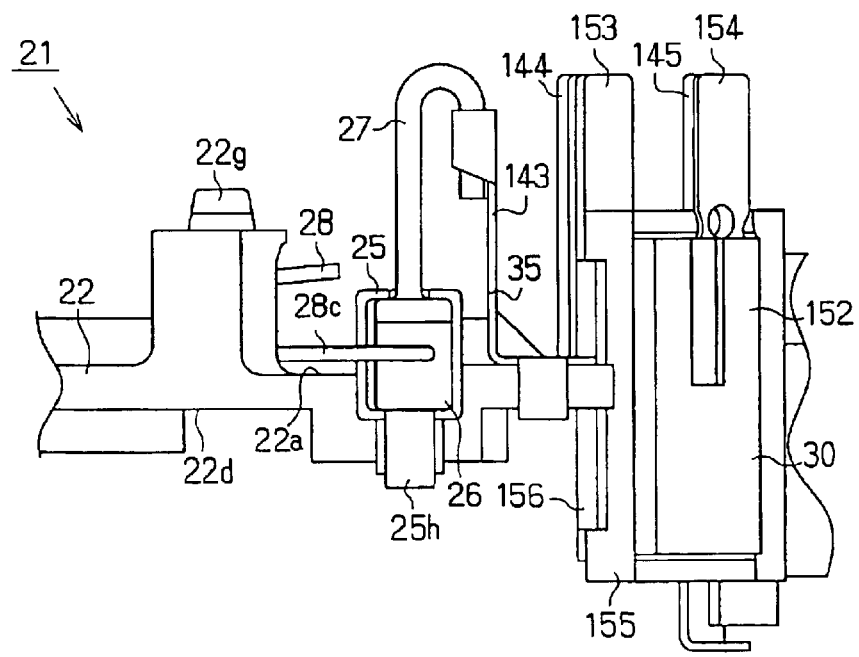
FIG. 8 is a view seen in a direction of arrow VIII in FIG. 7.
Figure 10:
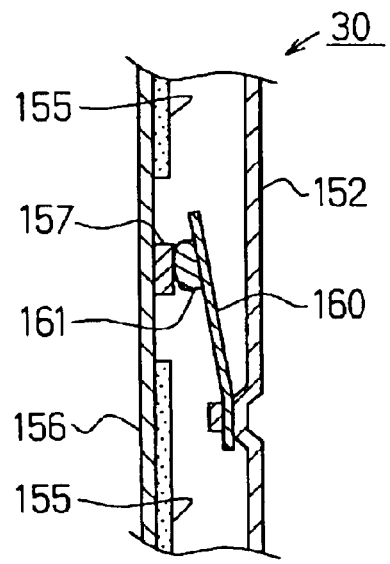
FIG. 10 is a partial cross sectional view of a circuit breaker of the brush holder device.

The circuit breaker 30 stops the flow of excessively large drive current supplied from the power source to prevent burnout of the wiper motor 1 during rotation of the wiper motor 1. With reference to FIGS. 8 and 10, the circuit breaker 30 includes the case 152, a plate like metal cover (a conductive housing member) 156 and a bimetal switch 160.

The case 152 is formed into a rectangular parallelepiped shape. A longitudinal intermediate portion of the case 152 (i.e., a longitudinal intermediate portion of the circuit breaker 30) is received in the receiving recess 129 such that the circuit breaker 30 extends from one axial side of the base plate 22 to the other axial side of the base plate 22 (i.e., from the top surface 22a side of the base plate 22 to the rear surface 22d side of the base plate 22). The case 152 projects in the same amount in each of the top surface 22a side and the rear surface 22d side of the base plate 22. The longitudinal direction of the case 152 is the same as an axial direction of the rotatable shaft 7 of the armature 6. In other words, the case 152 is arranged parallel to the rotatable shaft 7.

The case 152 includes the ground side terminal 154. The ground side terminal 154 projects in the thickness direction of the base plate 22 (i.e., in the axial direction of the rotatable shaft 7). The ground side terminal 154 projects in the same direction as that of the ground side terminal 145.

An axial height of the ground side terminal 154 is set to be generally the same as that of the ground side terminal 145. A radially inner side surface of the ground side terminal 154 is secured to a radially outer side surface of the distal end portion of the ground side terminal 145 by spot welding. In this way, the ground side terminal 154 is connected to the ground side terminal plate 31, so that the circuit breaker 30 is grounded through the ground side terminal plate 31 to output the drive current from the circuit breaker 30.

With reference to FIG. 10, the case 152 receives the bimetal switch 160, which has a movable contact 161 at a distal end of the bimetal switch 160 and has a base end secured to an inner surface of the case 152. An opening of the case 152 is closed by the plate like metal cover 156 via an insulating paper (an insulating member) 155, so that the cover 156 is installed to the case 152 while being electrically insulated from the case 152. In this way, the bimetal switch 160 is arranged between the case 152 and the cover 156. A fixed contact 157 is provided to an inner surface of the cover 156. When the movable contact 161 provided to a distal end of the bimetal switch 160 contacts the fixed contact 157, the case 152 and the cover 156 are electrically connected to one another through the bimetal switch 160 and the fixed contact 157, which cooperate together to serve as a switch means. An outer surface of the cover 156 contacts a receiving recess 129 side surface (i.e., a radially outer side surface) of the insulating plate portion 128. In this way, the cover 156 clamps the insulating plate portion 128 in corporation with the base end portion of the ground side terminal 145.

With reference to FIG. 8, in the cover 156, a positive pole side terminal 153, which serves as a first terminal, is formed to extend outwardly in the thickness direction of the base plate 22 (i.e., the axial direction of the rotatable shaft 7). Since the case 152 is electrically insulated from the cover 156, the positive pole side terminal 153 is electrically insulated from the ground side terminal 154, which serves as a second terminal. The positive pole side terminal 153 extends in the same direction as that of the positive pole side terminal 144 and projects to generally the same axial height as that of the positive pole side terminal 144. A radially inner side surface of the positive pole side terminal 153 is secured to a radially outer side surface of the positive pole side terminal 144 by spot welding. In this way, the positive pole side terminal 153 is electrically connected to the pigtail 27 of the common brush 26 through the positive pole side terminal plate 35 to input the drive current to the circuit breaker 30.

The insulating plate portion 128 is arranged between the cover 156 and the base end portion of the ground side terminal 145. When the ground side terminal plate 31 is connected to the ground side terminal 154, the insulating plate portion 128 is interposed between the ground side terminal plate 31 and the cover 156, to which the positive pole side terminal 153 is provided, so that the electrical insulation between the ground side terminal plate 31 and the cover 156 is maintained. Since the insulating plate portion 128 is clamped between the ground side terminal plate 31 and the cover 156, a predetermined secure position of the circuit breaker 30 is maintained at the time of securing the circuit breaker 30.

In this way, the common brush 26 is grounded through the pigtail 27, the positive pole side terminal plate 35, the cover 156, the fixed contact 157, the bimetal switch 160, the case 152 and the ground side terminal plate 31. When the excessively large current flows through the wiper motor 1, the temperature of the bimetal switch 160 made of a bimetal is increased and is deformed, so that the movable contact 161 of the bimetal switch 160 moves away from the fixed contact 157 to disconnect the current path of the wiper motor 1. That is, the circuit breaker 30 stops the flow of drive current supplied from the brush 26 when the excessively large drive current, which is equal to or greater than a predetermined value, flows between the positive pole side terminal plate 35 and the ground side terminal plate 31. Here, the excessively large drive current, which is equal to or greater than the predetermined value, is defined as electric current, which likely causes burnout of the wiper motor 1 during rotation of the wiper motor 1.

In order to minimize a size of the brush holder device 21, a circumferential extent of the cover 156 of the circuit breaker 30 overlaps with a circumferential extent of the positive pole side terminal 144 and a circumferential extent of the ground side terminal 145. Thus, if the ground side terminal 145 and the cover 156 contact with each other, the positive pole side terminal plate 35 and the ground side terminal plate 31 are electrically connected to one another, i.e., are shortcircuited without passing through the bimetal switch 160 to disenable the function of the circuit breaker 30.

However, in the present embodiment, the insulating plate portion 128 is interposed between the ground side terminal plate 31 and the cover 156 to prevent contact between the ground side terminal plate 31 and the cover 156. Thus, when the ground side terminal plate 31 is connected to the ground side terminal 154, the ground side terminal plate 31 is prevented from contacting the cover 156 to prevent electrical connection (short circuiting) between the positive pole side terminal plate 35 and the ground side terminal plate 31 without passing through the bimetal switch 160. As a result, the disenablement of the function of the circuit breaker 30 is prevented to effectively operate the circuit breaker 30.

Furthermore, since the insulating plate portion 128 is clamped between the cover 156 and the base end portion of the ground side terminal 145, the predetermined secure position of the circuit breaker 30, which is secured to the ground side terminal 145, can be maintained. As a result, it is possible to prevent unintentional contact of the circuit breaker 30 with any other electrical component or an electrical conductive line arranged on the base plate 22, which could be otherwise induced by, for example, vibration. Therefore, the circuit breaker 30 can be more reliably operated.

Advantages of the present embodiment will be described.

(1) Each brush holder 25 includes the lateral walls 25a, 25c, the top wall 25b and the base wall 25d, which are respectively bent at the right angle to form the brush holder 25, which is the generally rectangular tubular body opened in the sliding direction of the corresponding brush 26. Each holder limiting groove 22b, which limits the increase in the space between the lateral walls 25a, 25c of the brush holder 25, is formed in the base plate 22 made of the dielectric resin material. Each brush holder 25 is secured to the base plate 22 while the increase in the space between the lateral walls 25a, 25c is limited by the corresponding holder limiting groove 22b.

With the above arrangement, the brush 26, which is received in the brush holder 25, does not directly contact the base plate 22 due to the presence of the base wall 25d between the brush 26 and the base plate 22. Thus, even when the brush 26 is heated to the relatively high temperature upon operation of the motor 1, the heat of the brush 26 is not directly conducted to the base plate 22. Thus, melting and deformation of the base plate 22 by the heat can be advantageously limited without using the expensive heat resistant resin material for the base plate 22. Because of the above reason, the base plate 22 can be formed from the inexpensive resin material, which has the relatively low heat resistivity.

Furthermore, in each brush holder 25, the base wall 25d, which prevents direct contact between the brush 26 and the base plate 22, is integrally formed with the lateral walls 25a, 25c and the top wall 25b. Thus, it is not required to provide the dedicated separate component for limiting the thermal deformation of the base plate 22. As a result, the number of components is not increased.

In the brush holder 25, which is bent to have the generally rectangular tubular shape, the unjoined part 25e is formed. Thus, when the brush 26 is vibrated in the rotating direction of the commutator 6a upon sliding engagement with the commutator 6a, the brush holder 25 tends to deform to increase the space between the lateral walls 25a, 25c at the unjoined part 25e. However, such deformation is limited by the holder limiting groove 22b. Thus, it is possible to easily and effectively limit the increase in the space between the lateral walls 25a, 25c of the brush holder 25 only by providing the holder limiting groove 22b in the base plate 22 and then installing the brush holder 25 in the holder limiting groove 22b. Furthermore, positioning of the brush holder 25 on the base plate 22 can be easily achieved by the holder limiting groove 22b.

Thus, the manufacturing costs and the number of components of the wiper motor 1 can be minimized, and various disadvantages, which could be induced by the increase in the vibration of the brush 26 caused by the increase in the space between the lateral walls 25a, 25c of the brush holder 25, can be advantageously limited.

(2) Each brush holder 25 is secured to the base plate 22 by the two securing claws 25h, which clamp the base plate 22 and extend from opposed longitudinal ends of the base wall 25d, which are opposed to one another in the sliding direction of the brush 26. More specifically, the securing claws 25h are bent toward each other in the sliding direction of the brush 26, so that the brush holder 25 is secured not only in the engaging direction of the brush holder 25 with respect to the corresponding holder limiting groove 22b, i.e., in the circumferential direction of the base plate 22 but also in the sliding direction of the brush 26. Furthermore, the securing claws 25h are bent from the base wall 25d in the sliding direction of the brush 26, so that each radial end portion of the base wall 25d, which is located in a corresponding opening end of the brush holder 25, has no sharp edge and forms a curved bent surface. Thus, when the brush 26 is moved or is vibrated relative to the brush holder 25, the brush 26 is not scraped by any edge of the brush holder 25, so that generation of brush powder by scraping of the brush 26 is limited.

(3) The portion (the lower part) of each brush holder 25 is received in the corresponding holder limiting groove 22b, which is recessed in the base plate 22 to extend in the sliding direction of the brush 26. Furthermore, enlargement of the space between the lateral walls 25a, 25c is limited by the inner lateral surfaces of the holder limiting groove 22b. Also, since the portion of the brush holder 25 is received in the holder limiting groove 22b, the predetermined position of the brush holder 25 is maintained by the inner lateral surfaces of the holder limiting groove 22b. Thus, the sliding movement of the brush 26 relative to the commutator 6a is also stabilized.

(4) Each holder limiting groove 22b has the protrusions 22c, each of which engages the corresponding lateral wall 25a, 25c of the corresponding brush holder 25. More specifically, each of the lateral walls 25a, 25c only engages the corresponding protrusions 22c without engaging the entire corresponding lateral inner surface of the holder limiting groove 22b. In the case where the protrusions 22c are entirely eliminated to allow the surface contact of each lateral wall 25a, 25c with the entire corresponding inner lateral surface of the holder limiting groove 22b, precise dimensional control is required for the assembly of the brush holder 25 to ensure that each lateral wall 25a, 25c makes the close surface contact with the entire corresponding inner lateral surface of the holder limiting groove 22b. Unlike this case, according to the present embodiment, each lateral wall 25a, 25c is only engaged with the protrusions 22c, so that each lateral wall 25a, 25c makes the relatively small surface contact or the line contact with each of the corresponding protrusions 22c. As a result, even when the dimensional precision is relatively low, the brush holder 25 can be easily installed while the lateral walls 25a, 25c closely contact the protrusions 22c.

(5) Each brush holder 25 is arranged in such a manner that the unjoined part 25e, which is formed by bending the holder material 24 made from the metal plate into the generally rectangular tubular shape, is received in the corresponding holder limiting groove 22b. Thus, the rigidity of the holder 25, which is received in the holder limiting groove 22b, is improved to effectively limit the deformation of the brush holder 25. The rigidity of the brush holder 25 tends to be reduced due to the fact that the slits 25g, 25f need to be formed in corresponding exposed portions of the brush holder 25, which are exposed from the holder limiting groove 22b, to extend the pigtail 27 through the brush holder 25 or to receive the urging piece 28c of the torsion spring 28 through the brush holder 25. However, the unjoined part 25e of the brush holder 25 is received in the holder limiting groove 22b, so that the brush holder 25 is reinforced to maintain the shape of the brush holder 25, and thereby deformation of the brush holder 25 is limited.

(6) In the unjoined part 25e of each brush holder 25, as shown in FIGS. 4A and 4B, a downwardly projecting length L1 of a distal end (a lower end in FIGS. 4A and 4B) of the first lateral wall 25a, which is measured from a top surface (an engaging surface for engaging with the brush 26) of the base wall 25d, is set to be generally the same as a plate wall thickness of the brush holder 25. Furthermore, as shown in FIGS. 4A and 4B, the downward projection of the distal end (the lower end in FIGS. 4A and 4B) of the first lateral wall 25a from the top surface (the engaging surface for engaging with the brush26) of the base wall 25d is formed along the entire radial length of the brush holder 25 in the sliding direction of the brush 26. Upon setting the dimensions of the brush holder 25 in the above manner, when the first lateral wall 25a is urged to deform circumferentially inwardly, the first lateral wall 25a (more specifically, an inner lateral surface of the first lateral wall 25a) engages a corresponding opposed lateral end of the base wall 25d. Thus, further deformation of the first lateral wall 25a can be limited. As a result, it is possible to maintain an internal space (an accommodating space for accommodating the brush 26) of the brush holder 25.

(7) The insulating plate portion 128 is interposed between the ground side terminal plate 31 and the cover 156 to prevent contact between the ground side terminal plate 31 and the cover 156. Thus, when the ground side terminal plate 31 is connected to the ground side terminal 154, the ground side terminal plate 31 is prevented from contacting the cover 156 to prevent electrical connection (short circuiting)

between the positive pole side terminal plate 35 and the ground side terminal plate 31 without passing through the bimetal switch 160. As a result, the disenablement of the function of the circuit breaker 30 is prevented to effectively operate the circuit breaker 30.

(8) Since the insulating plate portion 128 is clamped between the cover 156 and the base end portion of the ground side terminal 145, the predetermined secure position of the circuit breaker 30, which is secured to the ground side terminal 145, can be maintained. As a result, it is possible to prevent unintentional contact of the circuit breaker 30 with any other electrical component or an electrical conductive line arranged on the base plate 22, which could be otherwise induced by, for example, vibration. Therefore, the circuit breaker 30 can be more reliably operated.

(9) The circuit breaker 30 is received in the receiving recess 129, which is radially inwardly recessed from the outer peripheral edge of the base plate 22 in the plane of the base plate 22. Thus, the circuit breaker 30 is entirely received in the receiving recess 129, so that the circuit breaker 30 does not radially protrude from the outer peripheral edge of the base plate 22. This arrangement limits an increase in the size of the brush holder device 21. Furthermore, the circuit breaker 30 can be easily positioned by simply receiving the circuit breaker 30 in the receiving recess 129.

(10) The longitudinal intermediate portion of the case 152 of the circuit breaker 30 extends from the one axial side of the base plate 22 to the other axial side of the base plate 22. Thus, it is possible to minimize an axial height of the connecting points of the circuit breaker 30 (i.e., the axial height of the positive pole side terminal 153 and the axial height of the ground side terminal 154 of the circuit breaker 30 measured from the top surface 22a of the base plate 22) for connecting with the positive pole side terminal plate 35 and the ground side terminal plate 31, which are provided in the base plate 22. Thus, the axial projecting amount of the circuit breaker 30 in the brush holder device 21 can be minimized. As a result, a space for accommodating the brush holder device 21 in the wiper motor 1 can be minimized in the axial direction of the rotatable shaft 7 of the armature 6.

(11) The insulating plate portion 128 projects from the peripheral edge of the receiving recess 129 in the thickness direction of the base plate 22. Furthermore, the insulating plate portion 128 projects on the both axial sides of the base plate 22. Also, the circuit breaker 30 extends from the one axial side of the base plate 22 to the other axial side of the base plate 22. In this way, the position of the circuit breaker 30, which is received in the receiving recess 129, can be securely maintained by the insulating plate portion 128. In addition, a contact surface area between the circuit breaker 30 and the insulating plate portion 128 is increased, so that the circuit breaker 30 can be effectively retained.

(12) The positive pole side terminal plate 35 is connected to the common brush 26, which is commonly used in both the high speed rotating operation and the low speed rotating operation of the wiper motor 1. Thus, the flow of excessively large drive current can be stopped in both of the high speed rotating operation and the low speed rotating operation of the wiper motor 1 by simply connecting the single circuit breaker 30 to the positive pole side terminal plate 35. In this way, the space required to accommodate the circuit breaker 30 in the brush holder device 21 can be minimized, and the number of components of the brush holder device 21 can be minimized to minimize the manufacturing costs of the wiper motor 1.

(13) It is possible to stop the flow of the excessively large drive current by the circuit breaker 30 when a relatively large load is applied to the wiper motor 1 for a relative long period at the time of, for example, wiping stacked heavy snow accumulated on the windshield by the wipers 100. Thus, the wiper motor 1 is protected from overheating, so that burnout of the wiper motor 1 can be prevented.

The above embodiment of the present invention can be modified as follows.

In the above embodiment, the brush holder 25 is formed into the shape shown in FIG. 5A. However, the shape of the brush holder 25 is not limited to this and can be changed to any appropriate one. For example, the position and shape of each securing claw 25h can be changed in any appropriate manner. Furthermore, the position and shape of each slit 25f, 25g can be also changed in any appropriate manner. Also, the unjoined part 25e is positioned between the first lateral wall 25a and the base wall 25d in the above embodiment. However, the position of the unjoined part 25e can be changed to any other appropriate position. Furthermore, the unjoined part 25e can be positioned in any exposed part of the brush holder 25, which is exposed from the holder limiting groove 22b.

In the above embodiment, the three brush holders 25 are arranged in the manner shown in FIG. 2. However, the number and position of the brush holders 25 are not limited to the above ones and can be changed in any appropriate manner.

Figure 11:
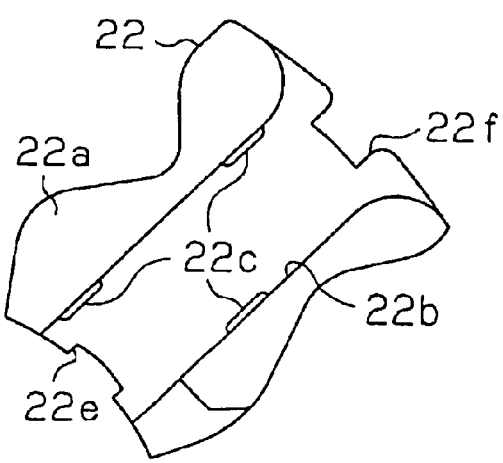
FIG. 11 is a partial plan view showing a modification of the holder limiting groove.

In the above embodiment, the two protrusions 22c are formed in the one of the circumferentially opposed planar inner lateral surfaces of the holder limiting groove 22b, and the other two of the protrusions 22c are formed in the other one of the circumferentially opposed planar inner lateral surfaces of the holder limiting groove 22b. Thus, the four protrusions 22c are formed in each holder limiting groove 22b. However, the position and number of the protrusions 22c are not limited to the above ones and can be changed in any appropriate manner. For example, as shown in FIG. 11, in place of the two protrusions 22c, a single protrusion 22c can be formed in the one of the circumferentially opposed planar inner lateral surfaces of the holder limiting groove 22b in such a manner that the single protrusion 22c is circumferentially opposed to an intermediate point, which is radially located between the two protrusions 22c formed in the other one of the circumferentially opposed planar inner lateral surfaces of the holder limiting groove 22b. Furthermore, each protrusion 22c has the generally rectangular cross section in the above embodiment. However, the shape of each protrusion 22c can be changed to any other appropriate shape. Furthermore, the protrusions 22c can be eliminated, if desired.

Figure 12:
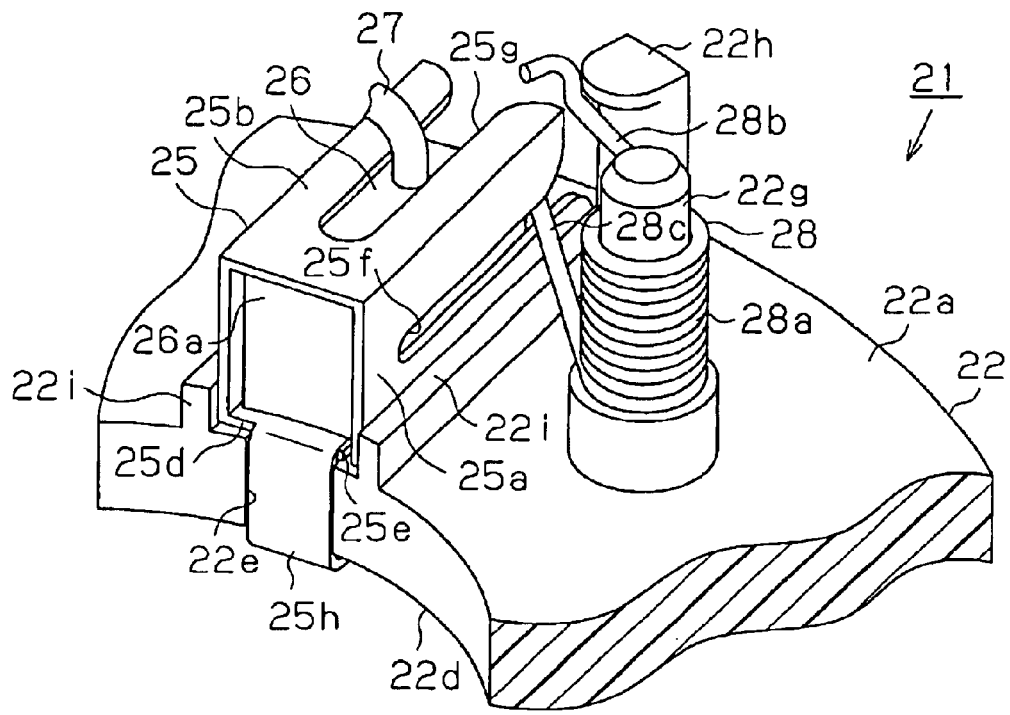
FIG. 12 is a partial perspective view showing a modification of the brush holder device.
Figure 13:
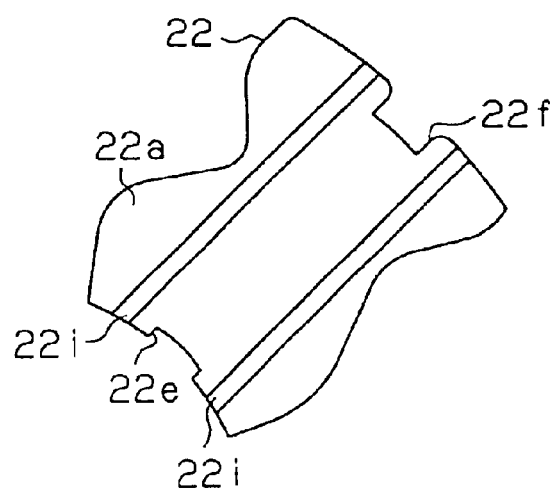
FIG. 13 is a partial plan view showing long limiting ridges of the brush holder device shown in FIG. 12.
Figure 14:
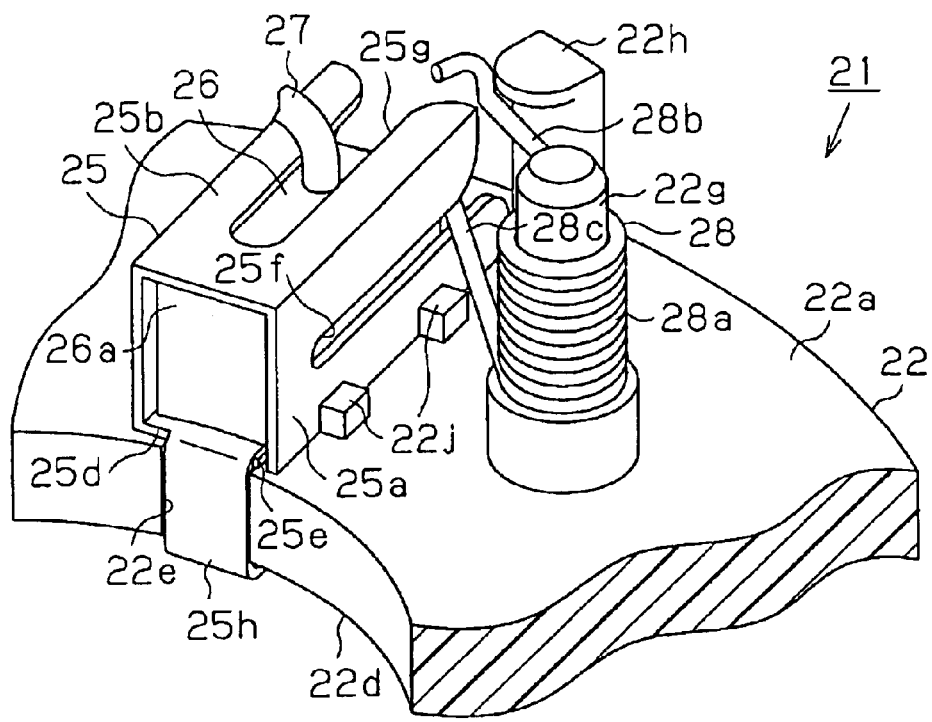
FIG. 14 is a partial perspective view showing a modification of the brush holder device.
Figure 15:
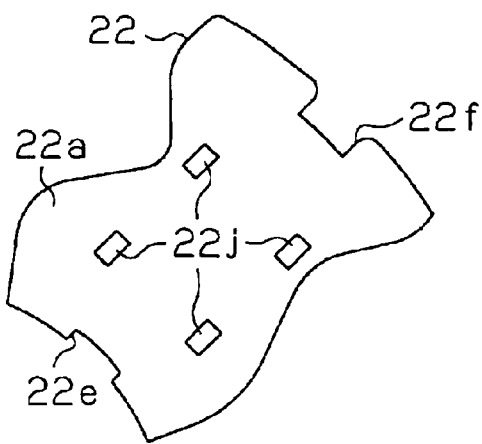
FIG. 15 is a partial plan view showing short limiting ridges of the brush holder device shown in FIG. 14.

In the above embodiment, the brush holder 25 is received in the corresponding holder limiting groove 22b to limit enlargement of the space between the lateral walls 25a, 25c. However, the enlargement of the space between the lateral walls 25a, 25c can be limited by any other structure other than the groove. For example, as shown in FIGS. 12 and 13, two long limiting ridges 22i can be formed as limiting portions in the base plate 22 for each brush holder 25. Each limiting ridge 22i has a radial length, which is generally the same as that of the brush holder 25. The brush holder 25 is positioned between the two long limiting ridges 22i to limit enlargement of the space between the lateral walls 25a, 25c. Furthermore, as shown in FIGS. 14 and 15, four short limiting ridges 22j, which are shorter than the long limiting ridges 22i, can be formed as limiting portions in the base plate 22 for each brush holder 25. Two of the four short limiting ridges 22j are formed on one circumferential side of the corresponding brush holder 25, and other two of the four short limiting ridges 22j are formed on the other circumferential side of the corresponding brush holder 25. Thus, the brush holder 25 is arranged between the circumferentially opposed short limiting ridges 22j to limit the enlargement of the space between the lateral walls 25a, 25c.

In the unjoined part 25e of each brush holder 25 of the above embodiment, the downwardly projecting length L1 of the distal end (the lower end in FIGS. 4A and 4B) of the first lateral wall 25a, which is measured from the top surface (the engaging surface for engaging with the brush 26) of the base wall 25d, is set to be generally the same as the plate wall thickness of the brush holder 25. However, the present invention is not limited to this. For example, as shown in FIGS. 16A and 16B, the distal end (the lower end) of the first lateral wall 25a can have a downwardly projecting length L2, which is measured from the top surface (the engaging surface for engaging with the brush 26) of the base wall 25d and is greater than zero but smaller than the plate wall thickness of the brush holder 25. Alternatively, as shown in FIGS. 17A and 17B, the distal end (the lower end) of the first lateral wall 25a can have a downwardly projecting length L3, which is measured from the top surface (the engaging surface for engaging with the brush 26) of the base wall 25d and is greater than the plate wall thickness of the brush holder 25. In this case, the distal end (the lower end) of the first lateral wall 25a projects downwardly from a back surface (an engaging surface for engaging with the base plate 22) of the base wall 25d. Thus, an accommodating recess 22k needs to be formed in the holder limiting groove 22b to receive the projecting axial distal end (the projecting axial lower end) of the first lateral wall 25a of the corresponding brush holder 25. Even in each of the above cases where the dimensions of the brush holder 25 are set in the manner shown in FIGS. 16A and 16B or 17A and 17B, when the first lateral wall 25a is urged to deform circumferentially inwardly, the first lateral wall 25a can still engage the opposed lateral end of the base wall 25d to limit further deformation of the first lateral wall 25a in the circumferentially inward direction. Thus, the internal space (the receiving space) of the brush holder 25 can be maintained.

In the above embodiment, the downward projection of the distal end (the lower end) of the first lateral wall 25a from the top surface (the engaging surface for engaging with the brush 26) radially extends along the entire length of the brush holder 25 in the sliding direction of the brush holder 26. Alternatively, only a portion(s) of the distal end (the lower end) of the first lateral wall 25a can be projected downwardly from the top surface (the engaging surface for engaging with the brush 26) of the base wall 25d. For example, as shown in FIG. 18, two downwardly projecting portions 25i can be provided in opposed longitudinal ends of the distal end (the lower end) of the first wall 25a, i.e., opposed radial ends of the distal end (the lower end) of the first wall 25a to project downwardly from the top surface (the engaging surface for engaging with the brush 26) of the base wall 25d.

In the above embodiment, the torsion spring 28 is used as the spring for urging the brush 26. Alternatively, any other appropriate spring, such as a coil spring or a spectacle spring, can be used in place of the torsion spring 28.

The structure of the brush holder device 21 of the above embodiment can be modified in any appropriate manner other than those discussed above.

In the above embodiment, the brush holder device 21 is used in the wiper motor 1. However, the brush holder device 21 can be used in any other appropriate dynamoelectric machine, such as a dynamo or a motor other than the wiper motor 1.

Figure 19:
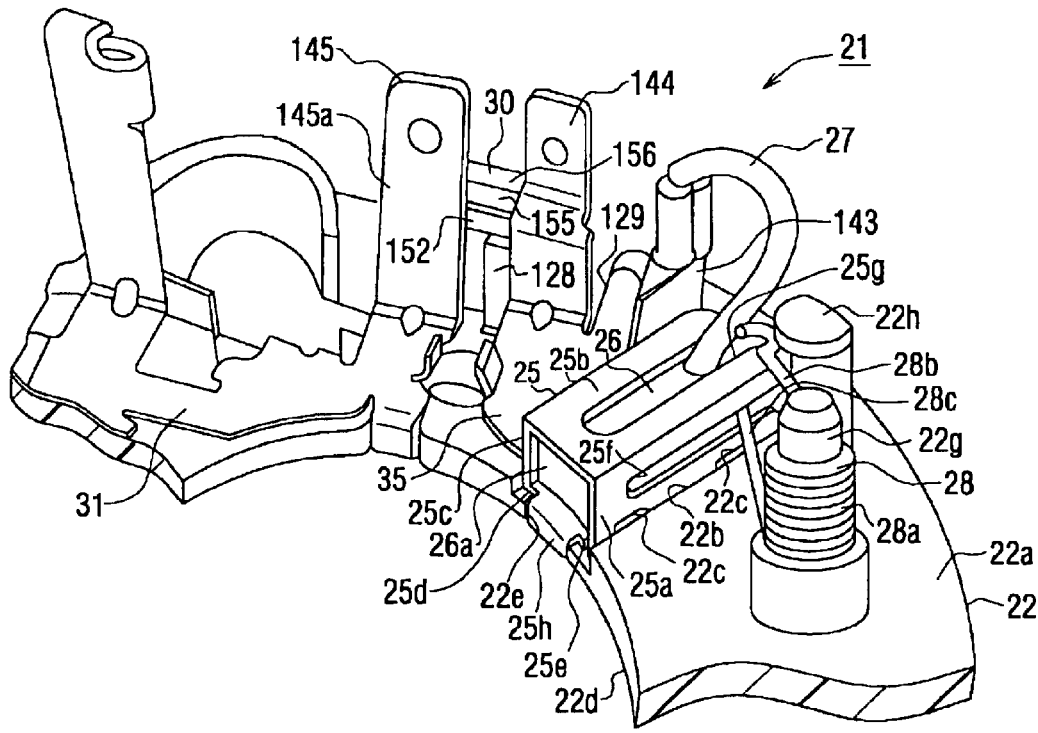
FIG. 19 is a partial perspective view similar to FIG. 7, showing a modification of the brush holder device.

In the above embodiment, the insulating plate portion 128 is interposed between the ground side terminal plate 31 and the cover 156 to prevent contact between the ground side terminal plate 31 and the cover 156. However, as shown in FIG. 19, the insulating plate portion 128 can be interposed between the positive pole side terminal plate 35 and the case 152 to prevent contact between the positive pole side terminal plate 35 and the case 152. In this case, the cover 156 is arranged radially outward of the base plate 22, and the case 152 contacts the receiving recess 129 side surface of the insulating plate portion 128.

Figure 20:
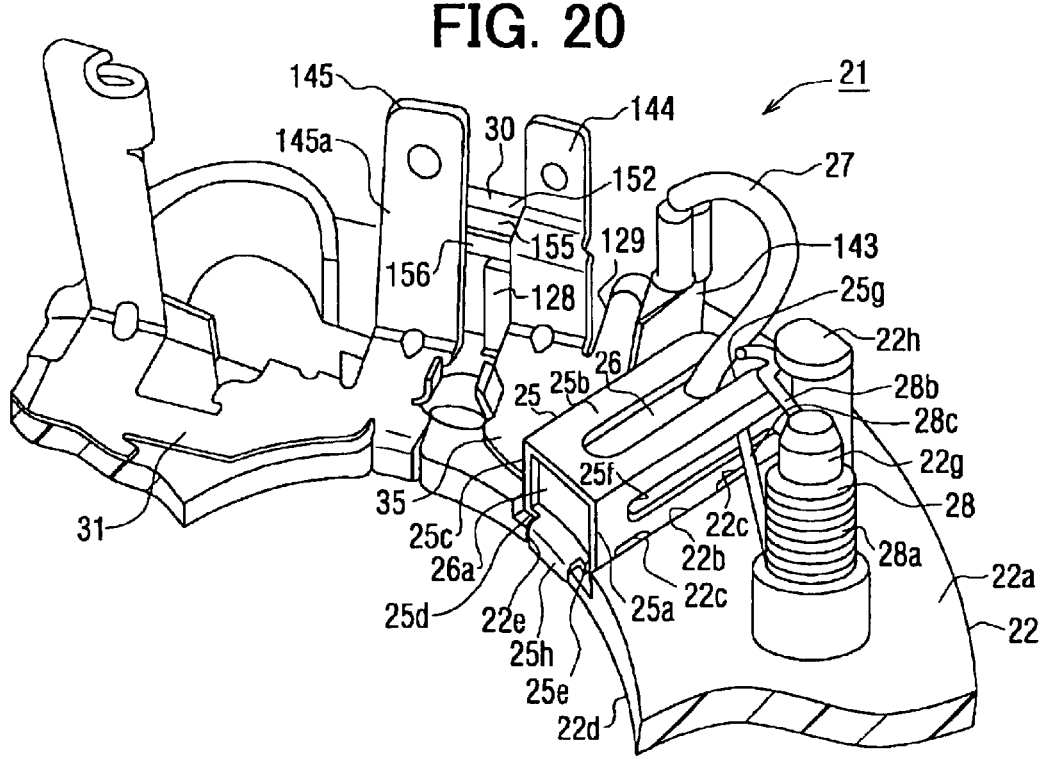
FIG. 20 is a partial perspective view similar to FIG. 7, showing another modification of the brush holder device.

Also, as shown in FIG. 20, the insulating plate portion 128 can be interposed between the positive pole side terminal plate 35 and the cover 156. In this case, the ground side terminal 154, which is connected to the ground side terminal 145, is formed in the cover 156, and the positive pole side terminal 153, which is connected to the positive pole side terminal 144, is formed in the case 152. In other words, the ground side terminal 154 is used as the first terminal, and the positive pole side terminal 153 is used as the second terminal.

Figure 21:
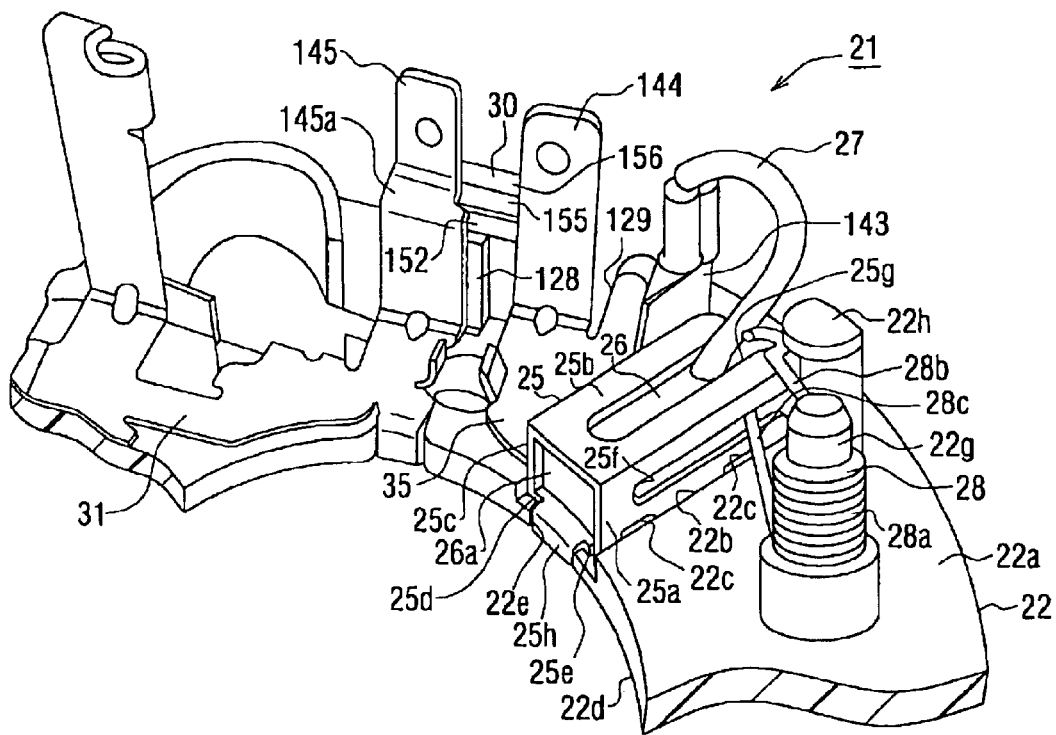
FIG. 21 is a partial perspective view similar to FIG. 7, showing a further modification of the brush holder device.

Also, as shown in FIG. 21, the insulating plate portion 128 can be interposed between the ground side terminal plate 31 and the case 152. In this case, the ground side terminal 154, which is connected to the ground side terminal 145, is formed in the cover 156, and the positive pole side terminal 153, which is connected to the positive pole side terminal 144, is formed in the case 152.

In the above embodiment, the radially outer side surface of the base end portion of the ground side terminal 145 contacts the radially inner side surface of the insulating plate portion 128, and the outer surface of the cover 156 contact the receiving recess 129 side surface of the insulating plate portion 128. Thus, the insulating plate portion 128 is clamped between the base end portion of the ground side terminal 145 and the cover 156. However, the radially outer side surface of the base end portion of the ground side terminal 145 can be spaced apart from the radially inner side surface of the insulating plate portion 128, and the outer surface of the cover 156 can be spaced apart from the radially outer side surface of the insulating plate portion 128. In this way, the insulating plate portion 128 is interposed between the ground side terminal 145 and the cover 156 while the insulating plate portion 128 is spaced from both the ground side terminal 145 and the cover 156.

In the above embodiment, the longitudinal intermediate portion of the case 152 is received in the receiving recess 129. However, any other portion of the case 152 other than the longitudinal intermediate portion of the case 152 can be received in the receiving recess 129.

In the above embodiment, the circuit breaker 30 is received in the receiving recess 129, which is radially inwardly recessed from the outer peripheral edge of the base plate 22 in the plane of the base plate 22. However, the receiving recess 129 can be eliminated. In this case, the circuit breaker 30 can be provided in the top surface 22a or the rear surface 22d of the base plate 22.

Figure 22:
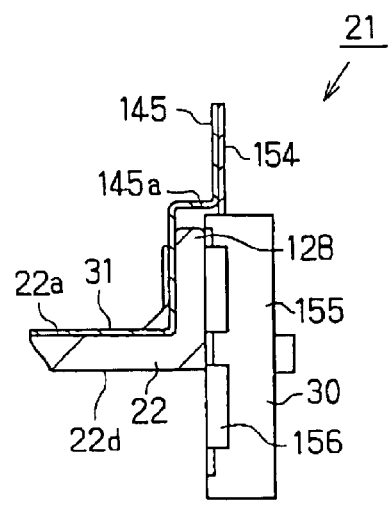
FIG. 22 is a cross sectional view similar to FIG. 9 showing a modification of the brush holder device.

In the above embodiment, the insulating plate portion 128 projects on both axial sides of the base plate 22. However, as shown in FIG. 22, the insulating plate portion 128 can be modified to project only from the top surface 22a of the base plate 22.

In the above embodiment, the circuit breaker 30 stops the flow of drive current when the drive current is equal to or greater than the predetermined value. However, the circuit breaker 30 can be modified to stop the flow of drive current when the temperature becomes equal to or greater than a predetermined temperature. For example, when the temperature of the circuit breaker 30 becomes equal to or greater than the predetermined temperature due to self-heating and the ambient temperature, the circuit breaker 30 can be operated to stop the flow of drive current.

In the above embodiment, the thermoset resin is used as the desired material of the base plate 22. However, depending on the operating environment of the wiper motor 1, any other appropriate material, such as thermoplastic resin, can be used to form the base plate 22.

In the above embodiment, the terminal plates 31, 35 are used as the terminal members. However, each of the terminal members is not limited to the terminal plate and can be any other appropriate conductive member, such as a conductive lead wire connected to a corresponding terminal similar to one of the terminals 144, 145.

In the above embodiment, the cover 156 and the case 152 are used as the conductive housing members of the circuit breaker, which are opposed to one another and are connected to one another. However, the conductive housing members (first and second housing members) are not limited to these and can be any other first and second conductive housing members. For example, each of the first and second conductive housing members can have an identical shape, such as a shape similar to that of the case 156, and the conductive housing members may define a receiving space therebetween for receiving the fixed contact and the movable contact.

In the above embodiment, the bimetal switch 160 is provided to the case 152, and the fixed contact 157 is provided to the cover 156. Alternatively, the bimetal switch 160 can be provided in the cover 156, and the fixed contact 157 can be provided in the case 152. Further alternatively, the fixed contact 157 can be eliminated, if desired. In such a case, the movable contact 161 of the bimetal switch 160 directly engages the inner surface of the cover 156, and thus the bimetal switch 160 alone serves as the switch means.

Additional advantages and modifications will readily occur to those skilled in the art. The invention in its broader terms is therefore not limited to the specific details, representative apparatus, and illustrative examples shown and described.

What is claimed is:

1. A brush holder device for a dynamoelectric machine, the brush holder device comprising:
    a base plate that is made of a dielectric resin material, wherein the base plate includes at least one limiting portion;
    at least one brush holder that is secured to the base plate, wherein:
        each of the at least one brush holder is formed by bending a holder material made of a metal plate, so that each of the at least one brush holder is shaped into a generally rectangular tubular body, which includes opposed first and second lateral walls, a top wall and a base wall;
    at least one of the at least one limiting portion of the base plate limits an increase in a space between the first lateral wall and the second lateral wall of a corresponding one of the at least one brush holder; and
    at least one brush, each of which is received in a corresponding one of the at least one brush holder in a slidable manner in a sliding direction toward and away from a commutator of the dynamoelectric machine.

2. The brush holder device according to claim 1, wherein:
    each of the at least one brush holder includes two securing claws that extend from two opposed longitudinal ends, respectively, of the base wall, which are opposed to one another in the sliding direction of the corresponding brush; and
    the two securing claws of each of the at least one brush holder clamp the base plate, so that the brush holder is secured to the base plate by the two securing claws.

3. The brush holder device according to claim 1, wherein:
    each of the at least one limiting portion is a limiting groove that is recessed in the base plate and extends in the sliding direction of the corresponding brush; and
    a portion of each of the at least one brush holder is received in the corresponding limiting groove.

4. The brush holder device according to claim 3, wherein:
    each limiting groove includes at least two protrusions; and
    two of the at least two protrusions of each limiting groove are provided in two opposed inner lateral surfaces, respectively, of the limiting groove in such a manner that the two of the at least two protrusions contact the first and second lateral walls, respectively, of the corresponding brush holder.

5. The brush holder device according to claim 3, wherein the base wall and one of the first and second lateral walls of each of the at least one brush holder are unjoined to form an unjoined part, which is received in the corresponding limiting groove.

6. The brush holder device according to claim 5, wherein a lateral end of the base wall of each of the at least one brush holder, which is located in the unjoined part of the brush holder, is opposed to an inner lateral surface of the one of the first and second lateral walls.

7. The brush holder device according to claim 6, wherein:
    an axial end of the one of the first and second lateral walls of each of the at least one brush holder, which is located in the unjoined part of the brush holder, axially projects beyond the base wall of the brush holder; and
    each limiting groove includes an accommodating recess that receives the axial end of the one of the first and second lateral walls of the corresponding brush holder, which axially projects beyond the base wall of the brush holder.

8. The brush holder device according to claim 1, wherein the dynamoelectric machine is a motor.

9. The brush holder device according to claim 8, wherein:
    the motor is a wiper motor for driving at least one wiper;
    the at least one brush holder includes three brush holders; and
    the at least one brush includes:
        a high speed brush that is powered when the motor is driven to rotate at a predetermined high speed to swing the at least one wiper at a high speed;
        a low speed brush that is powered when the motor is driven to rotate at a predetermined low speed to swing the at least one wiper at a low speed; and
        a common brush that is commonly used in both of the time of powering the high speed brush and the time of powering the lower speed brush.

10. The brush holder device according to claim 1, wherein the holder material of each of the at least one brush holder is a single holder material made of the metal plate, wherein the single holder material is bent to form the first lateral wall, the second lateral wall, the top wall and the base wall of the brush holder.

11. The brush holder device according to claim 1, further comprising:
   a terminal member that is connected to one of the at least one brush; and
   a circuit breaker that is connected to the one of the at least one brush through the terminal member, wherein the circuit breaker stops electric current, which passes through the one of the at least one brush, when the electric current, which passes through the one of the at least one brush, becomes equal to or greater than a predetermined value.

12. The brush holder device according to claim 11, wherein:
   the terminal member is a first terminal member;
   the circuit breaker includes:
      a first conductive housing member that includes a first terminal, which projects outwardly from the first conductive housing member and directly contacts the first terminal member to form an electrical connection therebetween;
      a second conductive housing member that is opposed to and is connected to the first conductive housing member, wherein the second conductive housing member includes a second terminal, which projects outwardly from the second conductive housing member;
      an insulating member that is held between the first conductive housing member and the second conductive housing member to electrically insulate between the first conductive housing member and the second conductive housing member; and
      a switch means that is placed between the first conductive housing member and the second conductive housing member, wherein the switch means electrically connects between the first conductive housing member and the second conductive housing member when the electric current, which passes through the one of the at least one brush, is less than the predetermined value, and the switch means electrically disconnects between the first conductive housing member and the second conductive housing member when the electric current, which passes through the one of the at least one brush, is equal to or greater than the predetermined value;
   the brush holder device further includes a second terminal member, which directly contacts the second terminal of the second conductive housing member to form an electrical connection therebetween; and
   the base plate includes an insulating projection, which is placed between one of the first and second terminal members and an adjacent one of the first and second housing members, which is positioned adjacent to the one of the first and second terminal members, to electrically insulate therebetween.

13. The brush holder device according to claim 12, wherein the second terminal member is grounded through a housing of the dynamoelectric machine.

14. The brush holder device according to claim 12, wherein the insulating projection is clamped between the one of the first and second terminal members and the adjacent one of the first and second conductive housing members.

15. The brush holder device according to claim 12, wherein the base plate further includes a receiving recess, which is radially inwardly recessed from an outer peripheral part of the base plate and receives the circuit breaker.

16. The brush holder device according to claim 15, wherein a longitudinal intermediate portion of the circuit breaker is received in the receiving recess of the base plate such that the circuit breaker extends from one axial side of the base plate to the other axial side of the base plate.

17. The brush holder device according to claim 16, wherein the insulating projection projects from a peripheral edge of the receiving recess in a direction generally perpendicular to a plane of the base plate.

18. The brush holder device according to claim 11, wherein:
   the at least one brush includes a plurality of brushes; and
   the one of the at least one brush is a common brush, which is commonly used with each of the rest of the plurality of brushes.

* * * * *